Nov. 16, 1926.

1,607,222

A. G. F. WALLGREN

BEARING

Filed May 6, 1925    2 Sheets-Sheet 1

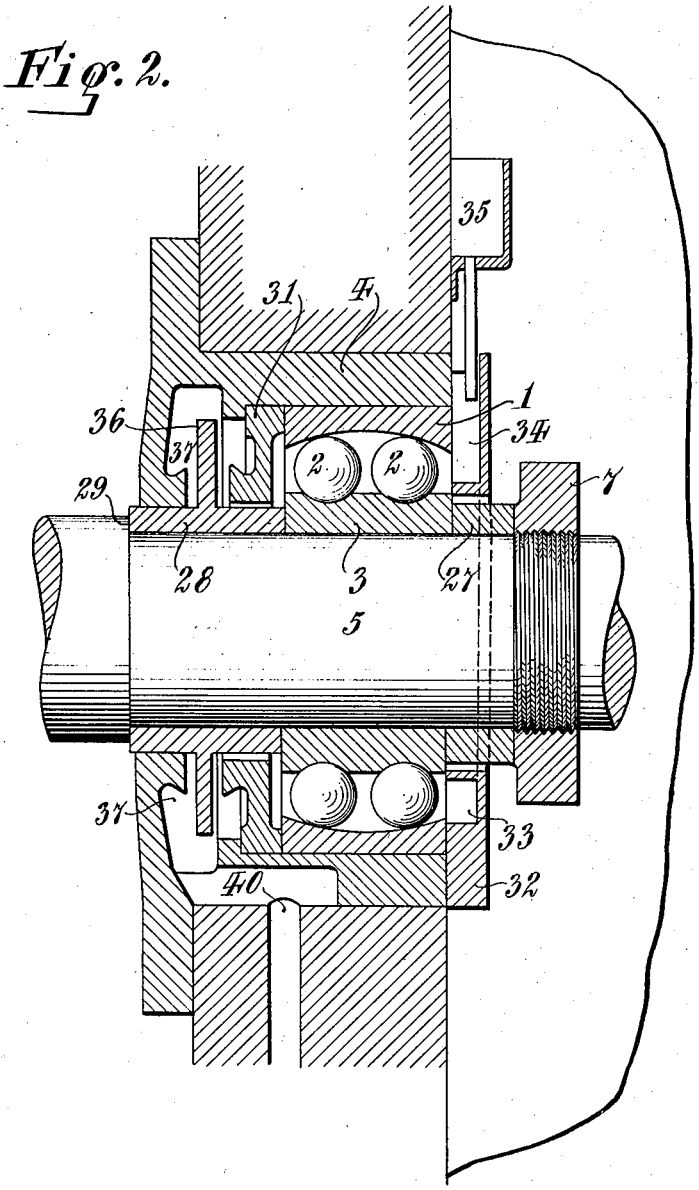

Patented Nov. 16, 1926.

1,607,222

UNITED STATES PATENT OFFICE.

AUGUST G. F. WALLGREN, OF SOBORG, NEAR COPENHAGEN, DENMARK, ASSIGNOR TO F. L. SMIDTH & CO., OF NEW YORK, N. Y., A CORPORATION OF NEW JERSEY.

BEARING.

Application filed May 6, 1925, Serial No. 28,282, and in France May 9, 1924.

This invention has for its object to prevent the penetration of dust into bearings, such as bearings of machinery employed in the manufacture of cement, which are exposed to the dust or finely divided particles of substances of such a character as to cause more or less rapid wear of contacting surfaces even in the presence of a lubricant. Felt washers retard the penetration of dust to some extent, but dust enters between the felt washers and the shaft and occasions wear which only becomes more rapid if the washers are pressed more tightly against the shaft. The so-called labyrinth dust guards, consisting of inter-engaging flanges, some of which are carried on the shaft while others are carried by the casing of the bearing, eventually suffer reduction of efficiency through the penetration of dust into the spaces between the outer members, with corresponding wear.

In accordance with the present invention the problem of preventing wear of the contacting surfaces of the bearing through the penetration of dust is solved by permitting the dust to enter within the housing of the bearing and there collecting and retaining it so that it cannot penetrate further to those portions of the bearing where it would cause harmful wear. To accomplish this there is formed within the housing a curtain of liquid which, being interposed between the point of entrance of the dust and the parts to be protected from dust, absorbs or collects the dust, excludes it from the contact surfaces of the bearing and makes possible its retention or its complete removal from the housing. The liquid employed to form the curtain may be the oil which is employed for lubricating the bearing. The dust guard may be applied to one or to both ends of a bearing as conditions of use may make it desirable.

The invention will be more fully explained hereinafter with reference to the accompanying drawings in which it is illustrated as embodied in suitable structures and in which—

Figure 2 is a similar view showing a slightly modified form of the invention, with means for a continuous supply of the oil or dust collecting liquid.

Figure 1:
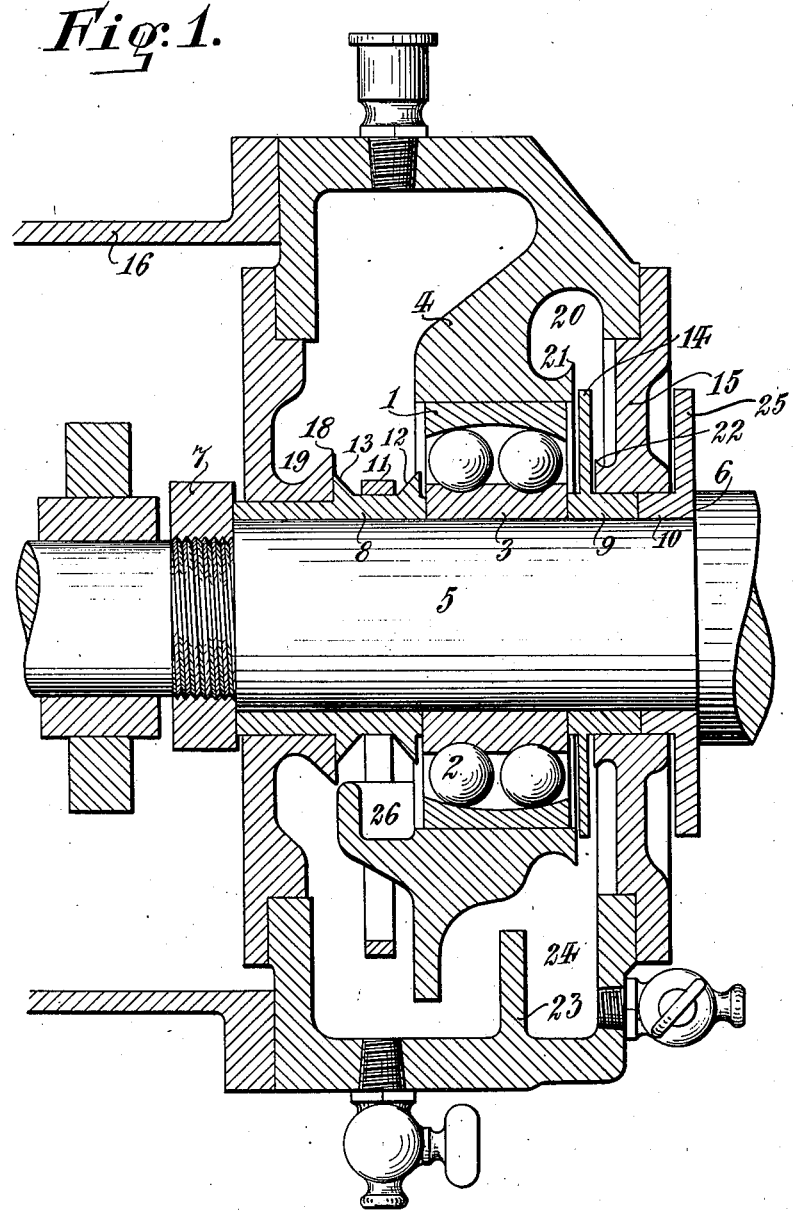
Figure 1 is a view in axial section of a bearing to which the dust guard is applied, the oil which forms the curtain and also lubricates the bearing being supplied from time to time.

In both of the illustrated embodiments of the invention the bearing to be protected from the penetration of dust is shown as an ordinary ball bearing having an outer ball race 1, balls 2, and an inner ball race 3. The outer ball race is shown as supported by a housing 4, which differs somewhat in form in the two embodiments of the invention, while the inner ball race is shown as mounted directly on the shaft 5. These parts, except as to the housing, may be of any usual or suitable character.

Referring now to the embodiment of the invention illustrated in Figure 1 it will be seen that the inner ball race 3 is held tightly between a shoulder 6 on the shaft 5 and a nut 7 thereon, a sleeve member 8, to be referred to, being interposed between the inner ball race 3 and the nut 7, and other sleeve members or rings 9, 10, being interposed between the ball race 3 and the shoulder 6. Hung loosely on the shaft 5, preferably through the medium of the sleeve member 8, is a lubricating ring 11 which dips into the body of oil in the lower part of the housing and in its rotation with the shaft and sleeve member lifts oil to the upper side of the shaft and sleeve member, the oil being thrown into the bearing, under the influence of centrifugal action, by an inclined flange 12 formed on the sleeve member 8. Surplus oil, not required for the bearing, is returned from the other side of the lifting ring 11 by an inclined flange 13 over a flange 18 formed in the housing and by a channel 19 to the body of oil in the lower part of the housing, this surplus oil, which does not pass between the contact surfaces of the bearing, is relatively clean at all times.

The oil which is directed between the contact surfaces of the bearing passes through the bearing toward that side of the bearing from which the dust enters the housing, it being assumed that in the construction shown the housing is continued, as at 16, to the motor by which the shaft 5 is driven, and that the dust against which the bearing is to be protected is developed at the right hand and outside of the housing.

At the right hand of the bearing 1, 2, 3, the shaft 5, through the intermediary of the sleeve member or ring 9, is provided with a flange 14, preferably of a diameter at least as large as the bearing proper, by which the oil which has passed through the bearing is thrown out, under centrifugal action, in all directions from the shaft, as a thin film, into the surrounding channel 20 and pocket 24, the latter being separated by a partition 23 from the chamber in the lower portion of the housing in which the relatively clean oil is retained and into which fresh oil is introduced from time to time through any conveniently placed filler. A flange 21, formed on the main body of the housing, and a flange 22 formed on the end plate 15, serve to direct the oil which is thrown out as a thin film by the flange 14 into the chamber 20, 24, so that it will return into the lower part 24 of such chamber.

The tendency of the rapidly rotating flange 14 is to draw air within the housing through the opening in the end cap 15 and with it such dust as may be carried by the air. To offset this tendency the shaft 5 is provided, through the intermediary of the sleeve member or ring 10, with a corresponding flange 25 which, by its centrifugal action, counteracts the action of the flange 14. There may also be provided, as indicated at 26, an oil cup to assist in the proper feeding of oil into the bearing 1, 2, 3.

It will now be seen that such dust as enters within the housing of the bearing will meet, before it can reach the contact surfaces, a continuous, thin film of oil (or other liquid, it may be) thrown off by the flange 14 and will be taken up or collected by such film and will pass with the liquid into the receptacle 24 from which it may be drawn off from time to time through a suitable draincock. Such dust as enters within the housing is thus effectually excluded from the contact surfaces of the bearing.

In the embodiment of the invention illustrated in Figure 1, the housing is exposed to the entrance of dust from the right hand side and the lubricating oil which forms the protective film is introduced within the housing from time to time in such quantity as may be necessary. In the embodiment of the invention shown in Figure 2, which will now be described, the housing is exposed to the entrance of dust from the left hand side and provision is made for a continuous supply of lubricating liquid, which is fed directly to the bearing instead of being lifted, as in the embodiment shown in Figure 1, from a receptacle in the lower part of the housing. The inner ball race in this instance is held on the shaft between a shoulder 29 formed on the shaft and a nut 7 threaded on the shaft, a sleeve member or ring 27 being interposed between the nut 7 and the inner ball race, and a sleeve member 28 being interposed between the shoulder 29 and the ball race. The oil in this instance is fed by gravity from a receptacle 35 into a channel 33, 34 from which it is fed directly to the contact surfaces of the bearing. From the bearing the oil passes through a fixed ring 31 into contact with the flange 36 preferably mounted on the shaft 5 through the intermediary of a sleeve member 28 and by which the film of oil, in the rotation of the flange with the shaft, is thrown off into the channel or chamber 37 from which the dirty oil may pass off continuously through a channel 40, to be purified for further use if so desired.

It will be understood that various changes in details of construction and arrangement can be made to suit different conditions of use and that, except as pointed out in the claims, the invention is not limited to the particular constructions shown and described herein.

I claim as my invention:

1. The combination with a bearing and a housing therefor, of a flange operatively associated with the housing and rotating with the rotary member of the bearing, means to supply liquid thereto to form a continuous film to intercept and collect dust particles which enter the housing and means to separate the liquid from the bearing surface during the continued operation of the bearing.

2. The combination with a shaft, a bearing, and a housing, of a flange operatively associated with the housing and mounted to rotate with the shaft, means to supply liquid thereto to form a continuous film to intercept and collect dust particles which enter the housing and means to separate the liquid from the bearing surface during the continued operation of the bearing.

3. The combination with a shaft, a bearing and a housing therefor, of means to supply oil to the bearing from one side, a flange operatively associated with the housing and mounted to rotate with the shaft at the other side of the bearing to receive the oil from the bearing and to form by centrifugal action a film between the bearing and the housing and means to separate the liquid from the bearing surface during the continued operation of the bearing.

4. The combination with a shaft, a bearing and a housing therefor, a source of oil, means to supply oil to the bearing from one side, a flange operatively associated with the housing and mounted to rotate with the shaft at the other side of the bearing to receive the oil from the bearing and to form, by centrifugal action, a film between the bearing and the housing, and means apart from the oil source to receive the oil from the film.

This specification signed this 23rd day of April, 1925.

AUGUST G. F. WALLGREN.